(12) United States Patent
Omiya

(10) Patent No.: US 8,433,594 B2
(45) Date of Patent: *Apr. 30, 2013

(54) SYSTEM, METHOD AND COMPUTER-ACCESSIBLE MEDIUM FOR MAKING WORKER DISTRIBUTION PLAN ON THE BASIS OF UPDATED SKILL ASSESSMENT DATA

(75) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 874 days.

This patent is subject to a terminal disclaimer.

(21) Appl. No.: 12/375,666

(22) PCT Filed: Jul. 31, 2007

(86) PCT No.: PCT/JP2007/064981
§ 371 (c)(1),
(2), (4) Date: Jan. 29, 2009

(87) PCT Pub. No.: WO2008/016045
PCT Pub. Date: Feb. 7, 2008

(65) Prior Publication Data
US 2009/0292581 A1 Nov. 26, 2009

(30) Foreign Application Priority Data
Jul. 31, 2006 (JP) ................................. 2006-208958

(51) Int. Cl.
*G06Q 10/00* (2012.01)
(52) U.S. Cl.
USPC .................... 705/7.11; 705/7.14; 705/7.22
(58) Field of Classification Search ............... 705/7.14, 705/7.22
See application file for complete search history.

(56) References Cited

U.S. PATENT DOCUMENTS

| 6,859,523 | B1 * | 2/2005 | Jilk et al. ................ 379/32.01 |
| 7,769,617 | B2 * | 8/2010 | Iwasaki et al. ........... 705/7.26 |
| 7,805,382 | B2 * | 9/2010 | Rosen et al. ............. 705/321 |
| 2006/0100945 | A1 * | 5/2006 | Macy et al. ............. 705/35 |

FOREIGN PATENT DOCUMENTS

| JP | 10-254962 | 9/1998 |
| JP | 2002-149931 | 5/2002 |
| JP | 2003-157343 | 5/2003 |
| JP | 2005-259067 | 9/2005 |

OTHER PUBLICATIONS

WIPO 2004040388, "System for Managing Worker, Unit for Managing Worker, and Method for Managing Worker", JP2003013841.*

(Continued)

*Primary Examiner* — Mark A Fleischer
(74) *Attorney, Agent, or Firm* — Dorsey & Whitney LLP

(57) ABSTRACT

According to exemplary embodiments of the present invention, system, method and computer accessible medium can be provided for making a worker distribution plan on the basis of updated skill assessment data. For example, a computer can be configured, programmed and/or structured to obtain a record data table collected and stored by a server. Further, such computer can update skill assessment data of each worker by updating work efficiency data determined from the average working hours per work according to the work record data included in the acquired record data table. In addition, the computer can select the workers to be assigned to projects for each predetermined period according to preferable and/or necessary worker data calculated from the predicted value of the workload for each predetermined period and the updated skill assessment data.

10 Claims, 10 Drawing Sheets

OTHER PUBLICATIONS

Herrmann, et al. "Affordable Space Systems Manufacturing: Intelligent Synthesis Technology, Process Planning, and Production Scheduling", Proceedings of DETC'01 ASME 2001 Design Engineering Technical Conferences and Computers and Information in Engineering Conference Pittsburgh, Pennsylvania, Sep. 9-12, 2001.*

English language International Search Report for International Application No. PCT/JP2007/064981 filed Jul. 31, 2007.

Decision for Rejection issued to Japanese Application No. 2006-208958 mailed Apr. 24, 2012.

* cited by examiner

TABLE OF PAST DATA

| WORKER ID | SKILL ID | DATA OF PAST WORK RECORD |
|---|---|---|
| 0001 | B | 4 MINUTES |
| 0002 | B | 16 MINUTES |
| 0003 | A | 5 MINUTES |
| 0004 | B | 16 MINUTES |
| 0005 | A | 4 MINUTES |
| 0006 | B | 4 MINUTES |
| ⋮ | ⋮ | ⋮ |

TABLE OF STANDARD AVERAGE OF HANDLE TIME

| SKILL ID | DATA OF STANDARD AVERAGE OF HANDLE TIME |
|---|---|
| A | 4 MINUTES |
| B | 8 MINUTES |
| . | . |
| . | . |
| . | . |

FIG. 7

TABLE OF SKILLS OF WORKERS (BEFORE AN UPDATE)

| WORKER ID | SKILL ID | DATA OF SKILL ASSESSMENT | |
|---|---|---|---|
| | | DATA OF SKILL LEVELS | DATA OF WORK EFFICIENCY (%) |
| 0001 | B | 150 | 100 |
| 0002 | B | 100 | 80 |
| 0003 | A | 80 | 80 |
| 0004 | B | 60 | 100 |
| 0005 | A | 100 | 100 |
| 0006 | B | 100 | 100 |
| . | . | . | . |
| . | . | . | . |
| . | . | . | . |

FIG. 8

TABLE OF SKILLS OF WORKERS (AFTER AN UPDATE)

| WORKER ID | SKILL ID | DATA OF SKILL ASSESSMENT | |
|---|---|---|---|
| | | DATA OF SKILL LEVELS | DATA OF WORK EFFICIENCY (%) |
| 0001 | B | 150 | 200 |
| 0002 | B | 100 | 50 |
| 0003 | A | 80 | 80 |
| 0004 | B | 60 | 50 |
| 0005 | A | 100 | 100 |
| 0006 | B | 100 | 200 |
| . | . | . | . |
| . | . | . | . |
| . | . | . | . |

TABLE OF REQUIRED WORKERS FOR A TASK
(RECEPTION OF REVOLVING PAYMENT, REQUIRED SKILL B, SEPTEMBER OF 06)

| DATE | 1 | 2 | 3 | 4 | ... | 20 | 21 | 22 | ... | 30 |
|---|---|---|---|---|---|---|---|---|---|---|
| DATA OF REQUIRED WORKERS | 1 | 1 | 3 | 3 | ... | 5 | 5 | 5 | ... | 3 |

FIG. 11

TABLE SCHEDULED FOR A TASK
(RECEPTION OF REVOLVING PAYMENT, REQUIRED SKILL B, SEPTEMBER OF 06)

| DAY | | | 1 | 2 | 3 | ...... |
|---|---|---|---|---|---|---|
| DATA OF REQUIRED WORKERS | | | 1 | 1 | 3 | ...... |
| NAME | SKILL LEVEL | WORK EFFICIENCY (%) | STATUS OF ASSIGNMENT | | | |
| ICHIRO ×× | 150 | 200 | × | × | ○ | ...... |
| JIRO ×× | 100 | 50 | × | × | × | ...... |
| SHIRO ×× | 60 | 50 | ○ | ○ | ○ | ...... |
| ROKURO ×× | 100 | 200 | × | × | ○ | ...... |
| EFFECTIVE NUMBER OF WORKERS | | | 0.5 | 0.5 | 4.5 | ...... |
| EXCESS OR SHORTAGE | | | −0.5 | −0.5 | +1.5 | ...... |

FIG. 12

TABLE OF REQUIRED WORKERS FOR A TASK
(RECEPTION OF REVOLVING PAYMENT, REQUIRED SKILL B, SEPTEMBER OF 06)

| DAY | | 1 | 2 | 3 | 4 | ... | 20 | 21 | 22 | ... | 30 |
|---|---|---|---|---|---|---|---|---|---|---|---|
| DATA OF REQUIRED WORKERS | | 1 | 1 | 3 | 3 | ... | 5 | 5 | 5 | ... | 3 |
| NAME | SKILL LEVEL | WORK EFFICIENCY (%) | | | | STATUS OF ASSIGNMENT | | | | | |
| ICHIRO ×× | 150 | 200 | × | × | ○ | ○ | ... | × | × | × | ... | × |
| JIRO ×× | 100 | 50 | ○ | ○ | ○ | ○ | ... | ○ | ○ | ○ | ... | ○ |
| SHIRO ×× | 60 | 50 | ○ | ○ | ○ | ○ | ... | ○ | ○ | ○ | ... | ○ |
| ROKURO ×× | 100 | 200 | × | × | × | × | ... | ○ | ○ | ○ | ... | ○ |
| EFFECTIVE NUMBER OF WORKERS | | 1.0 | 1.0 | 3.0 | 3.0 | ... | 3.0 | 3.0 | 3.0 | ... | 3.0 |
| EXCESS OR SHORTAGE | | 0 | 0 | 0 | 0 | ... | −2.0 | −2.0 | −2.0 | ... | 0 |

FIG. 13

TABLE OF REQUIRED WORKERS FOR A TASK
(RECEPTION OF REVOLVING PAYMENT, REQUIRED SKILL B, SEPTEMBER OF 06)

| DAY | | 1 | 2 | 3 | 4 | ... | 20 | 21 | 22 | ... | 30 |
|---|---|---|---|---|---|---|---|---|---|---|---|
| DATA OF REQUIRED WORKERS | | 1 | 1 | 3 | 3 | ... | 5 | 5 | 5 | ... | 3 |
| NAME | SKILL LEVEL | WORK EFFICIENCY (%) | | | | | STATUS OF ASSIGNMENT | | | | |
| ICHIRO ×× | 150 | 200 | × | × | × | × | ... | ○ | ○ | ○ | ... | ○ |
| JIRO ×× | 100 | 80 | ○ | ○ | × | × | ... | × | × | × | ... | × |
| SHIRO ×× | 60 | 40 | × | × | ○ | ○ | ... | × | × | × | ... | ○ |
| ROKURO ×× | 100 | 200 | × | × | ○ | ○ | ... | ○ | ○ | ○ | ... | × |
| EFFECTIVE NUMBER OF WORKERS | | 0.8 | 0.8 | 2.4 | 2.4 | ... | 4.0 | 4.0 | 4.0 | ... | 2.4 |
| RATE OF ASSIGNMENT OF WORKERS (%) | | 80 | 80 | 80 | 80 | ... | 80 | 80 | 80 | ... | 80 |

FIG. 14

TABLE SCHEDULED FOR A TASK
(RECEPTION OF REVOLVING PAYMENT, REQUIRED SKILL B, SEPTEMBER OF 06)

| DAY | | | 1 | 2 | 3 | 4 | ... | 20 | 21 | 22 | ... | 30 |
|---|---|---|---|---|---|---|---|---|---|---|---|---|
| DATA OF REQUIRED WORKERS | | | 1 | 1 | 3 | 3 | ... | 5 | 5 | 5 | ... | 3 |
| NAME | SKILL LEVEL | WORK EFFICIENCY (%) | \multicolumn{10}{c|}{STATUS OF ASSIGNMENT} |
| ICHIRO ×× | 150 | 200 | × | × | × | × | ... | ○ | ○ | ○ | ... | ○ |
| JIRO ×× | 100 | 80 | × | × | × | × | ... | ○ | ○ | ○ | ... | × |
| SHIRO ×× | 60 | 80 | ○ | ○ | × | × | ... | × | × | × | ... | × |
| ROKURO ××× | 100 | 220 | × | × | ○ | ○ | ... | ○ | ○ | ○ | ... | × |
| EFFECTIVE NUMBER OF WORKERS | | | 0.8 | 0.8 | 2.2 | 2.2 | ... | 5.0 | 5.0 | 5.0 | ... | 2.0 |
| EXCESS OR SHORTAGE | | | −0.2 | −0.2 | −0.8 | −0.8 | ... | 0 | 0 | 0 | ... | −1.0 |

FIG. 15

SCREEN FOR SETTING PEAK DAYS

| SEPTEMBER OF 2006 ||||||||
|---|---|---|---|---|---|---|
| SUN. | MON. | TUES. | WEDS. | THUR. | FRI. | SAT. |
|  |  |  |  |  | 1 ☐ | 2 ☐ |
| 3 ☐ | 4 ☐ | 5 ☐ | 6 ☐ | 7 ☐ | 8 ☐ | 9 ☐ |
| 10 ☐ | 11 ☐ | 12 ☐ | 13 ☐ | 14 ☐ | 15 ☐ | 16 ☐ |
| 17 ☐ | 18 ☐ | 19 ☐ | 20 ☑ | 21 ☑ | 22 ☑ | 23 ☐ |
| 24 ☐ | 25 ☐ | 26 ☐ | 27 ☐ | 28 ☐ | 29 ☐ | 30 ☐ |

SYSTEM, METHOD AND COMPUTER-ACCESSIBLE MEDIUM FOR MAKING WORKER DISTRIBUTION PLAN ON THE BASIS OF UPDATED SKILL ASSESSMENT DATA

CROSS-REFERENCE TO RELATED APPLICATION(S)

This application is a national stage application of International Application No. PCT/JP2007/064981 which was filed on Jul. 31, 2007, and published on Feb. 7, 2008 as International Publication No. WO 2008/016045 (the "International Application"). This application claims priority from the International Application pursuant to 35 U.S.C. §365, and from Japanese Patent Application No. 2006-208958 filed on Jul. 31, 2006, under 35 U.S.C. §119. The disclosures of the above-referenced applications are incorporated herein by reference in their entities.

FIELD OF THE INVENTION

Exemplary embodiments of the present invention relate to system, method and computer-accessible medium for planning an assignment of workers based on updated data related to a skill assessment.

BACKGROUND INFORMATION

Planning of the assignment (e.g., scheduling) of workers can be an important operation that may have an effect on the productivity of a business center. Such workers can include so-called operators and communicators at the business center (e.g., called a call center or contact center), who engage in tasks such as, e.g., responding to a call from a customer, promoting sales of a product and service, and reminders of receivables.

Administrators who are in charge of planning of the assignment (e.g., scheduling) of workers at such business center have been, e.g., conventionally preparing a plan of assignment of workers for a unit of task (campaign) based on the work efficiency in a form of, e.g., an Average Handle Time (AHT) or the information about qualitative skill levels. Certain publication have been provided which may be related to such methods, including, e.g., Japanese Unexamined Patent Publication No. 2003-157343.

Accordingly, there may be a need to address and/or overcome at least some of the deficiencies described herein above. To that end, it may be preferable to provide exemplary embodiments of system, method and computer-accessible medium for automatically generating a plan of assignment of workers based on various conditions, such as, for example AHT.

SUMMARY OF EXEMPLARY EMBODIMENTS OF THE PRESENT INVENTION

As described in Japanese Unexamined Patent Publication No. 2003-157343, there has been a limit in increasing the accuracy of selection of workers while planning the assignment of workers, since the changes in the work efficiency and skill levels of workers have generally not been incorporated into the prior AHT nor the information about the qualitative skills despite the fact that AHT and the qualitative skill levels of respective workers have been varying.

For example, a problem exists that a significant excess or shortage can occur for the required or preferred number of workers and/or a mismatch can occur between a required or preferred skill level and that of an assigned worker. This can happen, e.g., if the selection of workers is performed to plan the assignment of workers, without taking into consideration the changes in AHT and the qualitative skill levels of workers.

It is one of the objects of the exemplary embodiments of the present invention to provide system, method and computer-accessible medium for generating a plan of assignment of workers based on updated data of skill assessment.

Accordingly, an exemplary embodiment of a method which can be performed by a computer for selecting workers to be assigned to a task may be provided. For example, the computer can store, e.g., in a memory device or in another storage device, a table of skills of workers that can include worker identifications identifying workers, skill identifications identifying skills of the workers, and data associated with a skill assessment representing assessments of the skills of the workers. The data associated with the skill assessment can include data of skill level representing proficiency levels of the skills, and data associated with a work efficiency determined or calculated based on an average handle time per task.

Thus, using such exemplary embodiment of the method according to the present invention, it is possible to, e.g., using the computer, obtaining a table of past data including the worker identifications, the skill identifications and data of a past work record that are collected and stored by the computer on the memory device or on another storage device, the data of past work record being correlated with the worker identifications and the skill identifications. Further, using the computer, it is possible to update the data associated with the skill assessment by updating the data associated with the work efficiency based on the worker identifications, the skill identifications and the data associated with the past work record that are included in the table of the past data. Further, it is possible to, e.g., using the computer and/or computer connected selection devices, either manually with such computer and/or device or automatically by the computer, select workers to be assigned to a task during a predetermined period of time based on data related to a required number of workers that represents a number of workers having skills necessary for the task during the predetermined period of time and the updated work efficiency data, the required number of workers being calculated from an amount of work predicted for the predetermined period of time.

The exemplary embodiment of a system (e.g., the computer) may also be provided which can be configured, structured and/or programmed to store in the memory device or in another storage device the table of skills of workers that can include the worker identifications identifying the workers, the skill identifications identifying the skills of the workers and the skill assessment data representing assessments of the skills of the workers. As indicated above, the skill assessment data includes at least the data of skill level representing the proficiency levels of the skills, and the data of work efficiency calculated based on the average handle time per task. Such computer can also be configured, programmed and/or structured to obtain a table of the past data including at least the worker identifications, the skill identifications and the data associated with the past work record that are previously collected and/or stored, and the data associated with the past work record being correlated with the worker identifications and the skill identifications. Such exemplary embodiment of the computer can be used to update the skill assessment data by updating the data of work efficiency based on the worker identifications, the skill identifications and the data associated with the past work record that are included in the table of past data. Further, such exemplary embodiment of the computer can select workers to be assigned to a task during a predetermined period of time based on data related to a required number of workers that represents a number of workers having skills necessary for the task during the predetermined period of time and the updated work efficiency data, the required number of workers being calculated from an amount of work predicted for the predetermined period of time.

In this manner, the exemplary embodiment of the computer can be configured, programmed and/or structured to update the data associated with the skill assessment for each worker based on the obtained data associated with the past work record included in the table of past data, thereby selecting workers for a task during a predetermined period of time based on the updated data associated with the skill assessment and the required number of workers obtained by calculation/determination.

As a result, the computer can select workers based on the updated data of skill assessment.

It may be possible that the computer with the feature described above grasps the change in the skill of a worker so as to plan the assignment of workers while minimizing excess or shortage of workers and mismatching of skills.

According to another exemplary embodiment of the present invention, when selecting workers, the exemplary computer can be configured, programmed and/or structured to select the workers such that a ratio of the number of the workers selected to be assigned as opposed to the required number of workers obtained by the calculation/determination can be constant during the entire predetermined period of time. In this manner, the exemplary computer can be configured, programmed and/or structured to select the workers while facilitating the rate of assignment of the workers to be constant during the entire predetermined period of time. e.g., even if there is a shortage of the available workers compared to the required number of workers.

In yet another exemplary embodiment of the present invention, when selecting the workers, the exemplary computer can be configured, programmed and/or structured to prioritize the selection of the workers having higher values of the data of the work efficiency so as to satisfy the required number of workers obtained by the calculation/determination during a specific period of the peak time, which can require a higher rate of assignment of workers. As a result, the exemplary computer can be configured, programmed and/or structured to assign the workers so as to facilitate the rate of assignment of the workers to be, e.g., about 100% to the extent possible during the specific period of the peak time even if there is a shortage of the available workers compared to the required number of the workers.

According to still another exemplary embodiment of the present invention, when selecting workers, the exemplary computer can be further configured, programmed and/or structured to prioritize the selection of the workers having higher values of the data associated with the skill levels during the specific period of the peak time. As a result, the exemplary computer can be further configured, programmed and/or structured to prioritize the selection of the workers having higher skill levels during the specific period of the peak time when a task requiring a higher skill level, such as, e.g., dunning of payment is carried out, thereby facilitating the service level to be maintained as high as possible.

According to a still another exemplary embodiment of the present invention, the exemplary computer can be further configured, programmed and/or structured to update the data associated with the skill assessment for each worker based on the obtained data associated with the past work record included in the table of the past data, thereby possibly selecting workers for a task during the predetermined period of time based on the updated data of skill assessment and the required number of workers obtained by the calculation/determination. As a result, the exemplary computer can be further configured, programmed and/or structured to select the workers based on the updated data associated with the skill assessment. It is possible that the above-described exemplary computer can be configured, programmed and/or structured to change in the skill of a worker so as to plan the assignment of the workers while minimizing excess or shortage of the workers and mismatching of skills.

Exemplary embodiments of computer-accessible medium (e.g., memory, storage devices, etc.) can be provided which can store thereon software, such that when the exemplary computer accesses the computer-accessible medium and obtains the software, the software can configure, program and/or structure the exemplary computer to perform the exemplary procedures described herein.

These and other objects, features and advantages of the present invention will become apparent upon reading the following detailed description of embodiments of the invention, when taken in conjunction with the appended claims.

BRIEF DESCRIPTION OF THE DRAWINGS

Further exemplary objects, features and advantages of the invention will become apparent from the following detailed description taken in conjunction with the accompanying figure showing illustrative embodiment(s), result(s) and/or feature(s) of the exemplary embodiment(s) of the present invention, in which:

FIG. 7 is a table of exemplary skills of workers (e.g., before an update) according to an exemplary embodiment of the present invention;

FIG. 8 is a table of further exemplary skills of workers (e.g., after an update) according to an exemplary embodiment of the present invention;

FIG. 11 is a table of exemplary scheduling for a task according to an exemplary embodiment of the present invention;

FIG. 12 is a table of exemplary scheduling for a task according to another exemplary embodiment of the present invention;

FIG. 13 is a table of exemplary scheduling for a task according to still exemplary embodiment of the present invention;

FIG. 14 is a table of scheduling for a task according to yet another exemplary embodiment of the present invention; and FIG. 15 is a diagram illustrating an exemplary screen for setting peak days according to an exemplary embodiment of the present invention.

While the certain exemplary embodiments of the present invention will now be described in detail with reference to the figures, it is done so in connection with the illustrative embodiments.

DETAILED DESCRIPTION OF EXEMPLARY EMBODIMENTS

Figure 1:
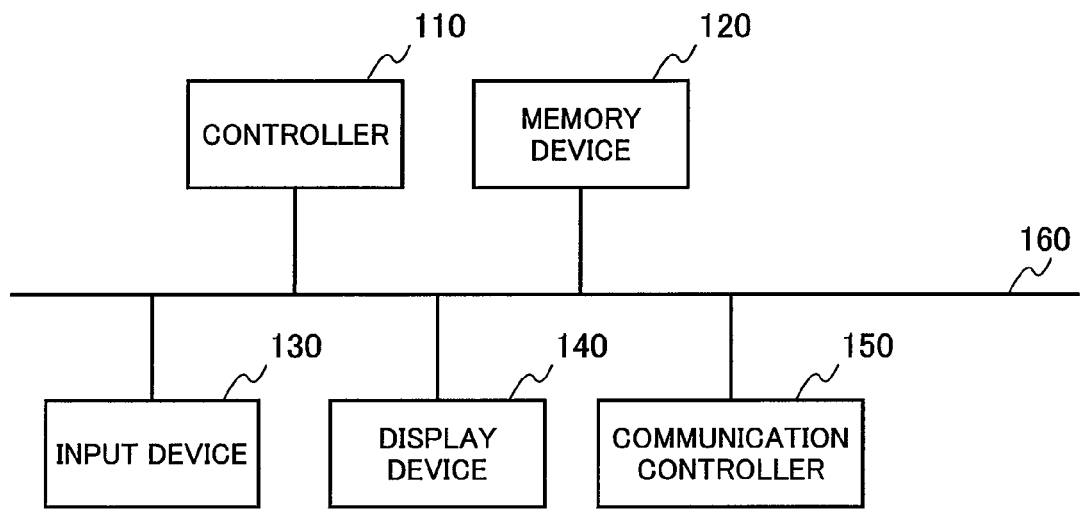
FIG. 1 is a block diagram illustrating an exemplary architecture of a computer according to an exemplary embodiment of the present invention.

FIG. 1 shows a block diagram illustrating an exemplary architecture of a computer 10 according to an exemplary embodiment of the present invention. For example, the computer 10 can include a controller 110, a memory/storage device 120, an input device 130, a display device 140 and a communication controller 150, which can be interconnected with via a bus 160.

The controller 110, which can be a central processing unit (CPU) to perform calculation and processing of information, may be configured, programmed and/or structured to perform an overall control of the computer 10. The controller 110 can read and/or access various computer programs stored in the memory device 120, and may execute one or more of these computer programs so as to collaborate with the hardware described above, e.g., implementing various functions associated with the exemplary embodiments of the present invention.

The memory/storage device 120 may include such memories as a local memory and a bulk memory having a large capacity that are used for executing the computer programs in combination with the controller 110, and a cash memory that is used for performing an efficient search of the bulk memory. The memory device 120 (e.g., as a computer readable storage medium or computer-accessible medium) may include, e.g., electrical, magnetic, optical and electromagnetic memories. For example, a memory device with semiconductors, a magnetic tape, a Floppy® disk, a random access memory (RAM), a read only memory (ROM), memory sticks, and optical disks including, e.g., CD-ROM, CD-R/W and DVD.

The input device 130, which can receive an input by a user, may include a keyboard, a pointing device and the like. The input device 130 can be connected to the computer directly or via an intermediate I/O controller.

The display device 140, which can display a screen for allowing a user to input data and a screen for indicating results of processing performed by the exemplary computer, may include a cathode ray tube (CRT), a liquid crystal display (LCD), etc.

The communication controller 150 can include or be a network adapter that may facilitate a connection of the exemplary computer to another calculation and/or processing system or to another memory or storage device via a dedicated network or a public network. The communication controller 150 may include a modem, a cable modem and an Ethernet® adapter.

A server 20, a terminal 40 and a PBX 50, which shall be described below with reference to FIG. 2, can include the exemplary architecture similar to the architecture of the exemplary computer 10. The terminal 40, which can be provided with a terminal for an analogue telephone line and/or a LAN terminal as the communication controller 150, may facilitate a telephonic communication or other electronic communication in conjunction with headset, mouse and/or keyboard.

Figure 2:
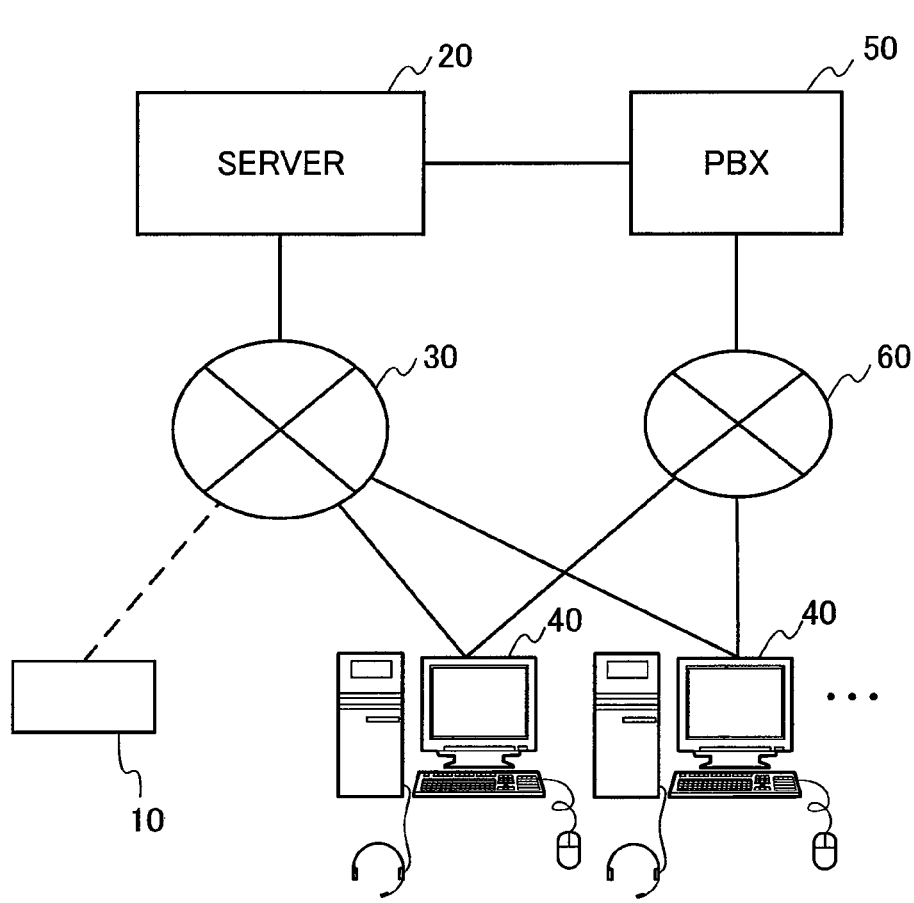
FIG. 2 is a network view illustrating an exemplary overall architecture of an exemplary embodiment of a computer system according to the present invention.

FIG. 2 is a network diagram illustrating an exemplary architecture of the exemplary computer system 1 according to an exemplary embodiment of the present invention. In this exemplary system 1, the exemplary computer 10, the exemplary server 20 and the exemplary terminal 40 can be configured, programmed and/or structured to be mutually connected with via a communication network 30. In addition, the server 20 and the PBX 50 may be connected with each other. Furthermore, the terminal 40 and the PBX 50 can be connected with one another via a telephone line network 60 or a further data network. In this manner, the computer 10 does not necessarily have to be connected with the server 20 via the communication network 30.

The server 20 can record data of a past work record for respective skills possessed by operators (hereinafter referred to as "workers"), and may perform various types of processing, such as transmitting the data of the past work record to the computer 10.

The server 20 may be implemented as a so-called CTI server, which can perform rooting of inbound calls in collaboration with the PBX 50 and calling of outbound calls in collaboration with ACD at a call center or contact center.

While the exemplary description is provided as an example of a call center where the operation is performed with telephones, the technical scope of the exemplary embodiments of the present invention is not limited to this example. Indeed, the exemplary principles of the exemplary embodiments of the present invention can be applied to numerous cases, including a case where email is similarly used for correspondence to customers. Further, the computer 10 can perform various types of processing procedures which shall be discussed herein.

Figures 3, 4:
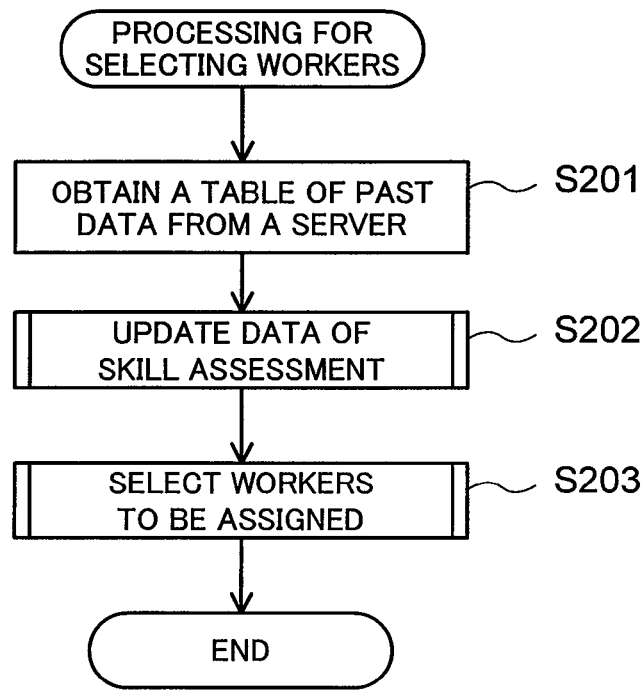
FIG. 3 is a flow chart depicting an exemplary embodiment of a method for processing for selecting workers performed by the exemplary embodiment computer according to the present invention.
FIG. 4 is a table of past data according to an exemplary embodiment of the present invention.

FIG. 3 shows a flow diagram depicting an exemplary embodiment of a processing method according to the present invention for selecting workers performed by the computer 10. For example, the controller 110 can obtain a table of past data from the server 20 in step S201. Various options may be adopted as exemplary methods for obtaining the table, such as obtaining via the communication network 30 and reading off-line (e.g., again with the computer 10) a table that is written out as a CVS file by the server 20. For example, the table of the past data shown in FIG. 4 is an exemplary table that contains data of the past work record for respective skills of exemplary workers at a call center. For example, as shown in FIG. 4, an exemplary worker having a worker ID "0001" possesses a skill of "B" and the data of past work record of "4 minutes." The data of past work record includes an average value of past work records for a skill possessed by a worker during a predetermined period of time.

Subsequently, turning to the flow diagram of FIG. 3, the controller 110 can perform processing for updating data associated with a skill assessment in step S202. As further described herein with reference to FIG. 5, the controller 110 can access and read, e.g., a table of standard average of handle time and a table of skills of workers in step S211. The computer 110 may store in advance the table of standard average of the handle time and the table of skills of the workers in the memory device 120 or in another storage device.

Figures 5, 6:
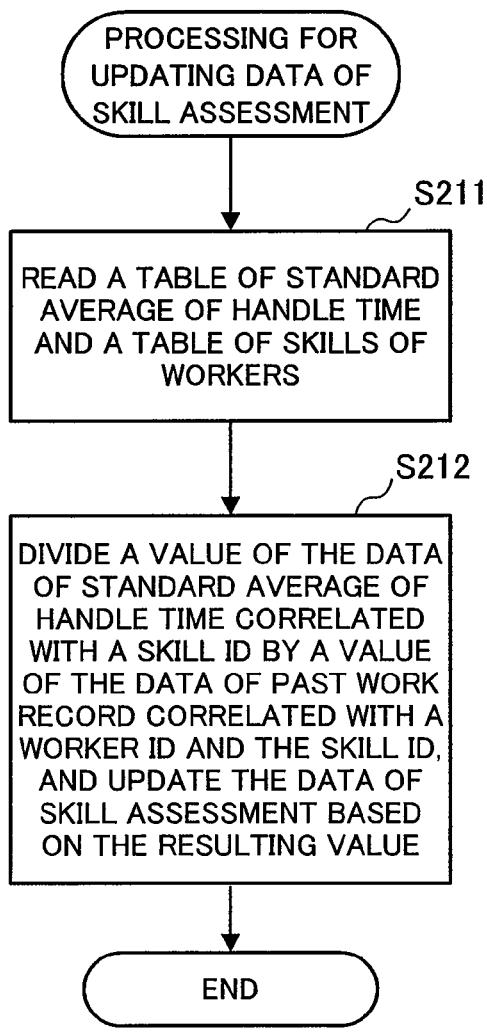
FIG. 5 is a flow chart depicting an exemplary embodiment of a processing method for updating data of skill assessment according to the present invention.
FIG. 6 is a table of an exemplary standard average of handle time according to an exemplary embodiment of the present invention.

The table of standard average of the handle time as shown in FIG. 6 is an exemplary table storing data of standard average of handle time for respective skills. For example, in FIG. 6, the exemplary standard average of handle time for a skill "A" is "4 minutes." In this manner, the standard average of the handle time corresponds to the handle time for a case where a value of the data of work efficiency for a skill is equal to "100."

A table of skills of the workers (e.g., before an update) shown in FIG. 7 is an exemplary table containing data associated with a skill assessment of the respective skills possessed by the workers. In addition, the data can contain data of skill levels representing the levels of proficiency and data of work efficiency, which may represent a ratio of data of the past work record to data associated with the standard average of handle time. The data associated with the work efficiency can be represented in a form of percentage according to the exemplary embodiment. In addition, the data associated with the skill levels and the data associated with the work efficiency can be in a range of, e.g., "0 to 999."

For example, a value of the data of skill levels possessed by a worker having a worker ID of "0001" is "150", and a value of the data associated with the work efficiency for the same worker is "100." The larger the value of the data associated with the skill levels, the higher a level of proficiency with respect to the skill may be. The larger the value of the data associated with the work efficiency, the smaller a value of the data associated with the past work record of a worker is or the shorter the handle time is.

Returning to FIG. 5, the controller 110 can subsequently perform (in step S212) a division calculation where a value of the data of standard average of handle time may be a dividend, which can be correlated with a skill ID, and a value of the data of past work record correlated with the worker ID and the skill ID being a divisor. The controller 110 can update the data of skill assessment based on the resulting quotient.

For example, a value of "8 minutes" of the data of standard average of handle time for a skill "B" shown in FIG. 6 can be divided by a value of "4 minutes" of the data associated with the past work record for the skill "B" corresponding to a worker having a worker ID of "0001." The quotient of "2" can be multiplied by 100, and the resulting value of "200" may be the value for the data associated with the skill assessment after an update.

A table (e.g., after an update) of skills of workers shown in FIG. 8 can be an exemplary table containing updated data of skill assessment for respective workers. The contents of this table can be similar to those provided in the exemplary table shown in FIG. 7. The exemplary table of FIG. 7 indicates that the value of the data associated with the work efficiency for the skill "B" possessed by the worker having the worker ID "0001" has been updated to "200" as described herein. Since the exemplary standard handle time can be defined for a case where a value of the data of work efficiency is equal to "100", the work efficiency of the skill "B" possessed by the worker having the worker ID "100" may be increased twofold.

Returning to the flow chart of FIG. 5, the controller 110 can terminate the processing for updating the data of skill assessment. Returning to the flow chart of FIG. 3, the controller 110 can perform the exemplary processing for selecting the workers to be assigned in step S203.

Figures 9, 10:
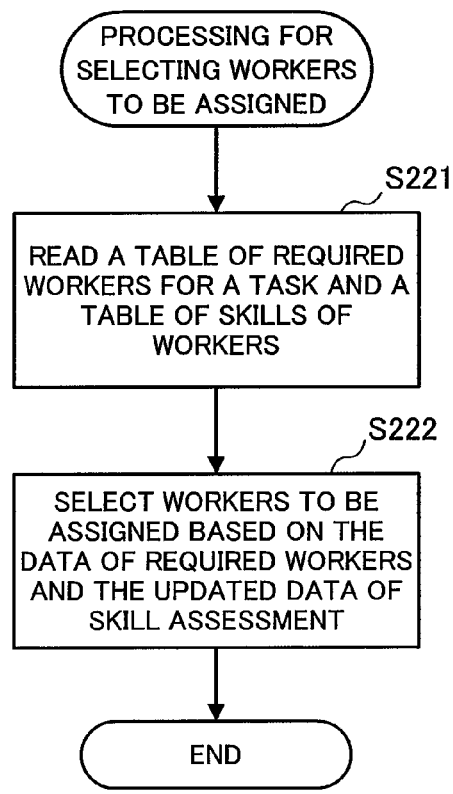
FIG. 9 is a flow chart depicting an exemplary embodiment of a processing method for selecting workers to be assigned according to an exemplary embodiment of the present invention.
FIG. 10 is a table of exemplary preferred and/or required number of workers for a task according to an exemplary embodiment of the present invention.

FIG. 9 shows a flow chart of an exemplary embodiment of a processing method for selecting workers to be assigned according to the present invention. For example, in step S221, the controller 110 can access and read a table of preferred and/or required workers for a task and a table of the skills of workers. The computer 10 can then store (e.g., in advance) the table of the preferred and/or required workers for a task in the memory device 120 or in another storage device.

An exemplary table of the preferred and/or required workers for the task (e.g., reception of revolving payment, preferred and/or required skill B, September of 06) shown in FIG. 10 contains the preferred and/or required number of workers (e.g., data of preferred and/or required workers) possessing required skills with respect to the task. For example, the exemplary table of FIG. 10 indicates that the task of "reception of revolving payment" prefers and/or requires the skill "B" and five workers on Sep. 20, 2006.

Returning to FIG. 9, the exemplary controller 110 can select the workers to be assigned based on the data associated with the preferred and/or required workers and the updated data of skill assessment in step S222. Upon a completion of the processing in step S222, the controller 110 may terminate the processing for selecting the workers to be assigned.

As methods for selecting the workers, it may be possible to use a publicly known statistical technique and a method employing AI (Artificial Intellect). In this manner, as the exemplary worker having work efficiency of, e.g., "100" is counted as one worker, the exemplary worker having work efficiency of "200" is counted as two workers, for example. In this way, the controller 110 can select the workers to be assigned by generating tables scheduled for the task, as shown in exemplary tables provided in FIGS. 11-14.

The exemplary tables scheduled for the task shown in FIGS. 11-14 indicate the exemplary status of the selection (e.g., a status of assignment) of the workers who have worker IDs corresponding to the skill "B" preferred and/or required for the reception of a revolving payment. In this manner, names and worker IDs can be correlated by a table (not shown) of a correspondence between the worker IDs and names. For example, the names such as Ichiro XX, Jiro XX, Shiro XX and Rokuro XX are correlated with worker IDs 0001, 0002, 0004 and 0006, respectively, in FIGS. 11-14. When a circle appears in the status of selection, it can indicate that the worker is assigned on the corresponding day. In contrast, a cross (or "X") may indicate no assignment of the workers.

The exemplary table scheduled for the task shown in FIG. 11 provides exemplary results of the selection of the workers performed by the controller 110 based on the table (e.g., before an update) of skills of workers shown in FIG. 7. The data associated with the work efficiency shown in FIG. 11 represents values after an update. The preferred and/or required number of workers on the second day is one, and one worker having the task efficiency of 50 can be assigned. Accordingly, the effective number of workers is 0.5, resulting in a shortage of 0.5 of the number of workers. In addition, the preferred and/or required number of the workers on the third day is three, and two workers having the task efficiency of 200 and one worker having the work efficiency of 50 can be assigned. Accordingly, the effective number of workers is 4.5, resulting in an excess of 1.5 of the number of the workers.

The table scheduled for the task shown in FIG. 12 provides an exemplary result of the selection of workers performed by the controller 110 based on the table (e.g., after an update) of skills of workers shown in FIG. 8. The controller 110 can perform the most appropriate selection of workers so as to eliminate an excess or shortage of workers resulting from the selection of workers based on the table (before an update) of skills of workers.

For example, the preferred and/or required number of the workers on the second day is one, and two workers having the task efficiency of 50 are assigned. Accordingly, the effective number of workers is 1.0, e.g., equivalent to zero of neither excess nor shortage of workers. Similarly, the required number of workers on the third day is three, and one worker having the task efficiency of 200 and two workers having the work efficiency of 50 can be assigned. Accordingly, the effective number of the workers is 3.0, equivalent to zero of neither excess nor shortage of workers. However, the effective number of workers is 3.0 for 5 of the required number of workers from the twentieth to twenty-second days, resulting in a shortage of 2.0 of the number of the workers.

The table scheduled for the task shown in FIG. 13 provides an exemplary result of the selection of the workers performed by the controller 110 so as to implement a constant ratio of assignment during an entire period of time, which can be intended to solve a problem in which an excessive shortage of workers may occur during a specific peak period requiring the large number of the workers as a result of achieving zero of neither excess nor shortage in the number of workers. In this connection, the ratio of assignment can represent a percentage of an effective number of workers to a preferred and/or required number of the workers.

For example, the required number of workers on the second day is one and one worker having the work efficiency of "80" is assigned. Accordingly, the effective number of workers is 0.8, equivalent to 80% of the ratio of the assignment. The required number of workers on the third day is three and one worker having the work efficiency of "200" and one worker having the work efficiency of "40" are assigned. Accordingly, the effective number of the workers is 2.4, e.g., equivalent to 80% of the ratio of assignment. Similarly, 80% of the rate of assignment can be acquired for five of the required number of workers from the twentieth day to the twenty-second day.

The table scheduled for the task shown in FIG. 14 provides an exemplary result of the selection of the workers that can be performed by the controller 110 such that the controller 110 may prioritize the selection of a worker having a higher work efficiency and a worker having a higher skill level among the workers if they have the same work efficiency. For example, the controller 110 can prioritize the selection of the workers having higher working efficiencies of "220" and "200", respectively, and a worker having a higher skill level from the workers having the work efficiency of "80" for the preferred and/or required number of workers of five during the twentieth day to the twenty-second day. Accordingly, the effective number of workers is 5.0, equivalent to zero of neither excess nor shortage in the number of workers.

In this way, it is possible to perform the selection of the workers to meet 100% of the ratio of assignment to the extent possible. In addition, it is possible to prioritize the selection of the worker having a higher skill level. Accordingly, it is possible to provide a service level as high as possible during the specific peak period.

An exemplary embodiment of a screen for setting peak days is shown in FIG. 15, on which a user can designates dates included in the specific peak period, and can check boxes in respective sections corresponding to the dates. For example, the user can designate a peak period by checking the respective check boxes in the twentieth to twenty-second days for a case where the twentieth to twenty-second days form the peak period.

Although the description has been given of an example of the data associated with the work efficiency represented in percentages, the exemplary embodiments of the present invention are not limited to this example. For example, it may be alternatively possible to utilize a raw ratio of the data associated with a standard average of handle time to the data associated with the past work record.

Although the description has been given of the present embodiment with daily scheduling, it may be alternatively possible to provide scheduling on a basis of month, hour, etc.

Although embodiments of the present invention have been described, the exemplary embodiments of the present invention are not limited to the foregoing embodiments. Moreover, it should be understood that the advantages described in association with the embodiments are merely a listing of exemplary advantages, and that the advantages of the exemplary embodiments of the present invention are in no way restricted to those described in connection with the exemplary embodiments.

Indeed, the foregoing merely illustrates the exemplary principles of the exemplary embodiments of the present invention. Various modifications and alterations to the described embodiments will be apparent to those skilled in the art in view of the teachings herein. It will thus be appreciated that those skilled in the art will be able to devise numerous modification to the exemplary embodiments of the present invention which, although not explicitly shown or described herein, embody the principles of the exemplary embodiments of the present invention and are thus within the spirit and scope of such exemplary embodiments. All publications, applications and patents cited above are incorporated herein by reference in their entireties.

The invention claimed is:

1. A method performed by a computer for selecting workers to be assigned to a task, comprising:
    with the computer, storing a table of skills of workers in a storage arrangement, the table of skills of the workers including worker identifications identifying the workers, skill identifications identifying skills of the workers, first data associated with a skill assessment representing assessments of the skills of the workers,
    wherein the first data includes skill-level second data associated with skill levels representing proficiency levels of the skills and work efficiency third data associated with a work efficiency determined based on an average handle time per task;
    with the computer, obtaining a table of fourth past data that includes the worker identifications, the skill identifications and fifth data associated with a past work record that are collected and stored by a server, the fifth data being correlated with the worker identifications and the skill identifications;
    with the computer, updating the first data by updating the third data based on the worker identifications, the skill identifications and the fifth data that are included in the table of past data; and
    with the computer, selecting one or more particular workers to be assigned to a task during a predetermined time period based on sixth data related to a preferred or required number of the workers that represents a particular number of the workers having one or more skills preferable or necessary for the task during the predetermined time period and the updated first data, wherein the computer determines a preferred or required number of the workers from an amount of work predicted for the predetermined time period.

2. The method according to claim 1, wherein, the computer is configured to select the one or more particular workers such that a ratio of a number of workers selected to be assigned versus the preferred or required number of the workers obtained by the determination is constant during an entirety of the predetermined time period.

3. The method according to claim 1, wherein the computer is configured to prioritize the selection of the one or more particular workers having higher values of the third data so as to satisfy the preferred or required number of the workers obtained by the determination during a specific period of a peak time.

4. The method according to claim 1, wherein the computer is configured to prioritize the selection of the one or more particular workers having higher values of the second data during a specific period of a peak time.

5. The method according to claim 1, wherein the third data associated with the work efficiency includes a ratio of the fifth data associated with a past work record to the average handle time per task.

6. The method according to claim 1 further comprising generating a table scheduled for the task corresponding to the predetermined time period.

7. A system for selecting workers to be assigned to a task, comprising
   a non-transitory computer-accessible medium having instructions thereon;
   at least one computer which, when the at least one computer executes the instructions, is configured to:
   i. store a table of skills of workers in a storage arrangement, the table of skills of the workers including worker identifications identifying the workers, skill identifications identifying skills of the workers, first data associated with a skill assessment representing assessments of the skills of the workers, wherein the first data includes skill-level second data associated with skill levels representing proficiency levels of the skills and work efficiency third data associated with a work efficiency determined based on an average handle time per task,
   ii. obtain a table of fourth past data that includes the worker identifications, the skill identifications and fifth data associated with a past work record that are collected and stored by a server, the fifth data being correlated with the worker identifications and the skill identifications,
   iii. update the first data by updating the third data based on the worker identifications, the skill identifications and the fifth data that are included in the table of past data,
   iv. select one or more particular workers to be assigned to a task during a predetermined time period based on sixth data related to a preferred or required number of the workers that represents a particular number of the workers having one or more skills preferable or necessary for the task during the predetermined time period and the updated first data, and
   v. determine a preferred or required number of the workers from an amount of work predicted for the predetermined time period.

8. The system according to claim 7, wherein the at least one computer is further configured to generate a table scheduled for the task corresponding to the predetermined time period.

9. A non-transitory computer accessible medium tangibly embodying executable code that, when executed by a computer, the computer is configured or programmed to perform procedures comprising:
   i. storing a table of skills of workers in a storage arrangement, the table of skills of the workers including worker identifications identifying the workers, skill identifications identifying skills of the workers, first data associated with a skill assessment representing assessments of the skills of the workers, wherein the first data includes skill-level second data associated with skill levels representing proficiency levels of the skills and work efficiency third data associated with a work efficiency determined based on an average handle time per task;
   ii. obtaining a table of fourth past data that includes the worker identifications, the skill identifications and fifth data associated with a past work record that are collected and stored by a server, the fifth data being correlated with the worker identifications and the skill identifications;
   iii. updating the first data by updating the third data based on the worker identifications, the skill identifications and the fifth data that are included in the table of past data;
   iv. selecting one or more particular workers to be assigned to a task during a predetermined time period based on sixth data related to a preferred or required number of the workers that represents a particular number of the workers having one or more skills preferable or necessary for the task during the predetermined time period and the updated first data; and
   v. determining a preferred or required number of the workers from an amount of work predicted for the predetermined time period.

10. The non-transitory computer accessible medium according to claim 9, wherein the computer is further configured or programmed to generate a table scheduled for the task corresponding to the predetermined time period.

* * * * *